April 21, 1959 W. P. MASON 2,883,486

PIEZOELECTRIC SWITCHING DEVICE

Filed March 9, 1954 2 Sheets-Sheet 1

INVENTOR
W. P. MASON
BY [signature]
ATTORNEY

April 21, 1959 W. P. MASON 2,883,486

PIEZOELECTRIC SWITCHING DEVICE

Filed March 9, 1954 2 Sheets-Sheet 2

INVENTOR
W. P. MASON
BY [signature]
ATTORNEY

United States Patent Office 2,883,486

Patented Apr. 21, 1959

2,883,486

PIEZOELECTRIC SWITCHING DEVICE

Warren P. Mason, West Orange, N.J., assignor to Bell Telephone Laboratories, Incorporated, New York, N.Y., a corporation of New York Application March 9, 1954, Serial No. 414,933

14 Claims. (Cl. 200—87)

This invention relates to electrically operated switches or relays and more particularly to such switches or relays employing piezoelectric actuating elements.

Two fundamental types of driving units for relays are utilized in the art, a magnetic type of drive and a piezoelectric or polarized electrostrictive type of drive. For relay speeds up to one millisecond, magnetic drives are generally employed since the use of the usual piezoelectric or polarized electrostrictive materials would necessitate a prohibitively large physical structure in order to obtain sufficient energy from a central source.

For higher relay speeds, however, the electrical circuit parameters assume values that are physically realizable with piezoelectric or polarized electrostrictive materials, affording therewith attendant advantages, including reliability, long life, rapidity of action and low energy consumption.

An object of the invention is to improve the operation of piezoelectrically actuated relays.

A more particular object of the invention is to provide a piezoelectric relay which will operate at a very high speed.

An additional object of this invention is to provide a piezoelectric relay having a balanced mechanical structure, free from unwanted vibrations.

A further object of this invention is to provide a piezoelectric relay having minimal contact chatter.

These and other objects of the invention may be realized by one construction comprising an inner stack of piezoelectric crystals spaced between two outer stacks of piezoelectric crystals. The outer stacks are joined by a yoke which overlies the inner stack. Matable contacts are mounted on the top of the inner stack and on the underside of the yoke. The stacks are so arranged that upon the application of a direct voltage thereto, the outer stacks will contract longitudinally and the inner stack will expand longitudinally, thereby effecting a closure of the contacts.

In another aspect of this invention, an improved piezoelectric relay having a balanced mechanical form and minimal contact chatter is realized. This is achieved by having the contractible and expansible members each comprise a pair of stacks. The two expansible stacks are joined by a yoke which underlies another yoke joining the contractible stacks. Matable contacts are provided on each yoke. A balanced construction is thereby afforded and, in addition, both make and break contacts can be obtained.

In the drawing:

Fig. 1 graphically depicts the displacement for the thickness mode upon the application of a potential difference to a polarized ceramic illustrative of those which may be used in devices constructed in accordance with this invention;

Fig. 2 graphically illustrates the displacement for the length mode when a potential difference is applied to the same polarized ceramic;

Figure 3:
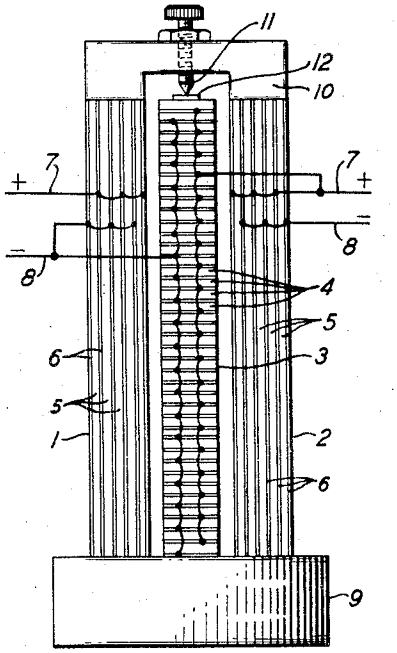
Fig. 3 is a side elevation of an embodiment of the invention in the form of a relay having normally open contacts.
Figure 5:
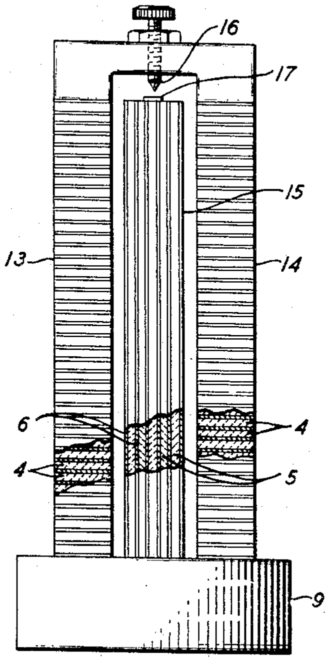
Fig. 5 is a side elevation of another embodiment of the invention in the form of a relay whose contacts are normally closed.
Figure 7:
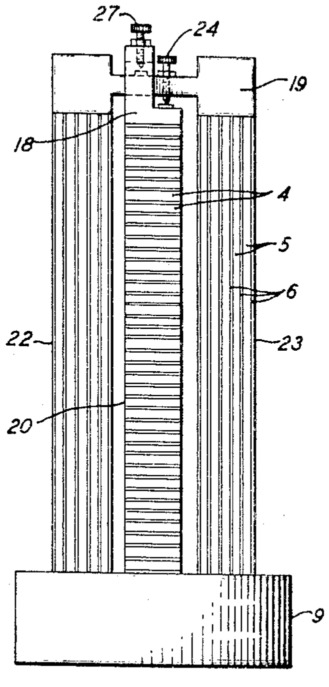
Fig. 7 is a side elevational view of the embodiment of Fig. 6.

It will be noted that the relays of Figs. 3, 5 and 7 are illustrated in the operated condition.

Figure 1:
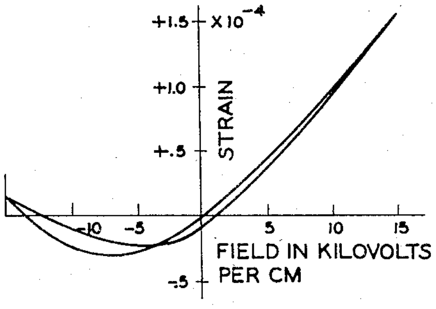

Refer now to Fig. 1. The curve shown indicates the displacement (or strain) of the thickness mode in relation to the potential gradient applied to a barium titanate ceramic crystal having a 4 percent inclusion of lead titanate. At a potential gradient of 15,000 volts per centimeter the thickness expansion will result in an increased thickness of about $1.5\times10^{-4}$ parts.

Figure 2:
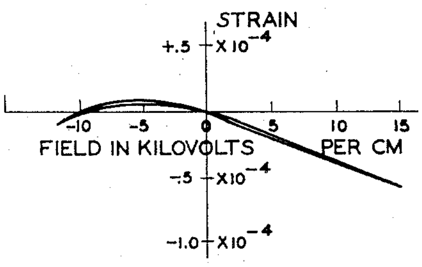

Fig. 2, which depicts the displacement of the length mode of the same barium titanate crystal, reveals that at the same potential gradient of 15,000 volts per centimeter, there is a corresponding contraction in length of about $0.57\times10^{-4}$ parts. Although the characteristics of Figs. 1 and 2 are those of barium titanate, it will be understood that other substances normally used as piezoelectric elements may be utilized in the embodiment of this invention, including but not limited to Rochelle salt, crystalline ammonium dihydrogen phosphate, $NH_4H_2PO_4$, known in the art as an ADP crystal, and others.

Barium titanate is selected in the preferred form of the invention because of its high "d" constant, i.e., high strain set up in the crystal for a given applied field. While Rochelle salt has a "d" constant which approaches that of barium titanate, its characteristics are less stable. Other piezoelectric substances having low "d" constants will require higher potential difference to produce an equivalent strain.

In the embodiment of the invention shown in Fig. 3, the two outside stacks 1 and 2 and the inside stack 3 are constructed of polarized laminations. The laminations 4 of the inner stack are perpendicular to its length and the laminations 5 of each outer stack are parallel to its length. The two outer stacks are joined by a yoke 10 which overlies the inner stack. The yoke 10 should be of a material which would not give rise to difficulties as the result of temperature expansion differentials. Thus, in the present embodiment the yoke 10 may be advantageously of barium titanate. Electrodes 6 separate the crystal laminations 4 and 5 and are in electrical contact with the contiguous surface of each crystal on both sides of the electrode.

As can be seen from Fig. 3, the positive conductor 7 is connected to alternate electrodes in each stack. The negative conductor 8 is connected to the remaining electrodes. Consequently, each crystal lamination has the positive conductor 7 connected to one of its electrodes and the negative conductor 8 connected to the other electrode. When conductors 7 and 8 are energized, a direct-current potential difference appears across each lamination, resulting in the contraction of the outer stacks 1 and 2, expansion of the inner stack 3, and engagement of the screw contact 11 and contact 12.

It is to be understood that in order to avoid depolarization, the actuating voltage advantageously should be applied in the same direction as the polarization.

Figure 4:
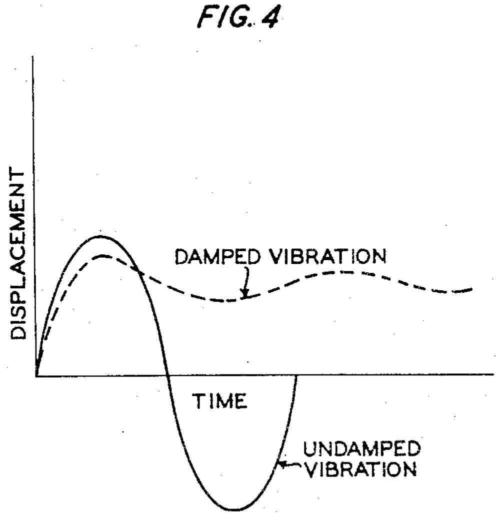
Fig. 4 illustrates the displacement with respect to time of a vibrating crystal structure having the characteristics shown in Figs. 1 and 2.

The stacks are affixed to a rigid base 9, advantageously of barium titanate, as in the case of the yoke 10, to obviate the possibility of difficulties occasioned by temperature expansion differentials. Fig. 4 shows that for a damped vibration, maximum displacement occurs in about one-quarter of the complete cycle. The damping is achieved through the internal frictional dissipative effects of the laminations. The characteristic shown for a damped vibration in Fig. 4 is generic of that experienced in either the thickness or length mode.

The physical parameters of the stack should be made such as to achieve full displacement in the desired time.

Therefore, in order to achieve a full displacement in 10 microseconds, for example, a structure having a resonant frequency of about 25 kilocycles is required. Since maximum displacement is desired in 10 microseconds and is achieved at about the first quarter of the cycle, the period of vibration will be equal to 40 microseconds corresponding to a frequency of 25 kilocycles. The structure will act as a quarter wave resonator whose length will be determined by the relationship:

$$l=\frac{V}{4F}$$

in which $l$=length of the stack
$V$=velocity of the wave
$F$=resonant frequency With a velocity in barium titanite of $4.4\times10^5$ centimeters per second, the length $l$ is equal to $$\frac{4.4\times10^5\text{ cm./sec.}}{4\times25{,}000^{\sim}\text{/sec.}}$$

or 4.4 centimeters for a 10-microsecond operation. In accordance with this length and with the displacements shown in Figs. 1 and 2, the two outer stacks 1 and 2 will contract longitudinally to the extent of 0.00025 centimeter and at the same time the inner stack 3 will expand longitudinally by 0.00066 centimeter as follows:

$$4.4\text{ cm.}\times0.57\times10^{-4}=0.00025\text{ cm. or }0.098\text{ mil inch}$$
$$4.4\text{ cm.}\times1.5\times10^{-4}=0.00066\text{ cm. or }0.26\text{ mil inch}$$

The aggregate relative travel of the stacks is equal to the sum of the two displacements, 0.00091 centimeter or 0.36 mil inch.

Consequently, if the screw contact 11 and contact point 12 in Fig. 3 are separated by less than 0.36 mil inch they will close in less than 10 microseconds.

The foregoing explanation pertains to the construction of a relay having normally open contacts as depicted in Fig. 3.

To provide a relay having normally closed contacts the relative positions of the contractible and expansible stacks may be reversed, as shown in Fig. 5. In operation, the outside stacks 13 and 14 will expand longitudinally and the inside stack 15 will contract longitudinally, effecting an opening of the previously closed contacts 16 and 17.

Figure 6:
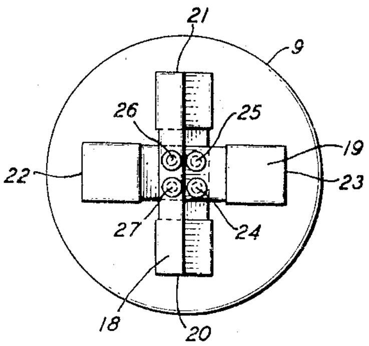
Fig. 6 is a plan view of still another embodiment of the invention in the form of a relay having a balanced mechanical structure with both normally opened and normally closed contacts.

Through the use of four stacks as in Figs. 6 and 7 a balanced mechanical structure may be achieved, affording substantial freedom from unwanted vibration. As shown in these figures, two yokes 18 and 19 are used, the yoke 18 joining the expansible stacks 20 and 21 and the yoke 19 joining the contractible stacks 22 and 23. In this embodiment both make and break contacts are possible. Contacts 24 and 25 are normally open and will close when the relay is actuated. Contacts 26 and 27 are normally closed and will open when the relay is actuated. This structure, thus, has the advantage of a balanced mechanical action in which all motions occur symmetrically with respect to the center line.

It is to be understood that the embodiments shown are exemplary; other combinations possible will be apparent to those skilled in the art and will not depart from the scope of this invention.

What is claimed is:

1. A switching device comprising a pair of motor elements each deformable longitudinally in response to application of a voltage thereto, said elements being fixed at one end and having free portions in juxtaposition and related so that the spacing therebetween varies upon longitudinal deformation of said elements in opposite directions, matable contact members coupled to said free portions respectively, and means for applying voltages to said elements to effect concurrent longitudinal deformation of the two elements in opposite directions.

2. A switching device comprising a pair of motor elements each deformable longitudinally in response to application of a voltage thereto, said elements having juxtaposed portions related so that the spacing therebetween varies upon longitudinal deformation of said elements in opposite directions, matable contact members coupled to said juxtaposed portions, and means for applying voltages to said elements to effect concurrent longitudinal deformation of the two elements in opposite directions.

3. A switching device comprising a first elongated piezoelectric motor element, a second elongated piezoelectric motor element, means mounting said elements in spaced adjacent relation with one pair of corresponding ends fixed and the other corresponding ends free, matable contacts coupled respectively to said free ends and positioned so that the spacing therebetween varies upon elongation of one of said elements and contraction of the other of said elements, and means for energizing said elements to effect concomitant elongation of one and contraction of the other.

4. A device according to claim 3 wherein said means mounting said elements includes a base member of the same material comprising said piezoelectric motor elements.

5. A switching device according to claim 3 wherein said first piezoelectric motor element comprises a stack deformable in the length mode, said second piezoelectric motor element comprises a stack deformable in the thickness mode and said means for energizing said elements comprises a source of direct-current voltage, and means for applying said voltage to said stacks to energize said stacks in their respective modes.

6. A switching device according to claim 5 wherein said piezoelectric motor elements are of barium titanate.

7. A piezoelectric relay comprising a first elongated barium titanate motor element 4.4 centimeters in length and deformable in the length mode, a second elongated barium titanate motor element 4.4 centimeters in length and deformable in the thickness mode, means mounting said elements in spaced adjacent relation with one pair of corresponding ends fixed and the other corresponding ends free, matable contacts coupled respectively to said free ends and positioned so that the spacing therebetween varies upon elongation of one of said elements and contraction of the other of said elements, said spacing not to exceed 0.0009 centimeter when said motor elements are deenergized, and means for energizing said elements to effect concomitant elongation of one element and contraction of the other element whereby said contacts will engage in substantially ten microseconds.

8. A switching device comprising a first motor element and a second motor element wherein said first element is encompassed within said second element, each of said elements being deformable longitudinally in response to application of a voltage thereto, said elements being fixed at one end and having free portions in juxtaposition and related so that the spacing therebetween varies upon longitudinal deformation of said elements in opposite directions, matable contact members coupled to said free portions respectively, and voltage means for energizing said elements to effect simultaneous longitudinal deformation of the two in opposite directions.

9. A switching device according to claim 8 wherein said first motor element expands longitudinally and said second motor element contracts longitudinally.

10. A switching device according to claim 8 wherein said first motor element contracts longitudinally and said second motor element expands longitudinally.

11. A switching device according to claim 8 wherein said second motor element comprises a plurality of longitudinally deformable members.

12. A piezoelectric switching device comprising a first and a second motor element, said first motor element comprising two stacks of piezoelectric crystals longitudinally expansible upon the application of a direct voltage thereto, said second motor element comprising two stacks of piezoelectric crystals longitudinally contractible upon the application of a direct voltage thereto, a free end and a constrained end on each of said stacks, a rigid base member, means for affixing said constrained ends of said stacks to said base member in spaced proximity, a first yoke joining the free ends of said contractible stacks, a second yoke joining the free ends of said expansible stacks and underlying said first yoke, contact members integral with said first yoke, additional contact members integral with said second yoke, and means for impressing an electrical voltage on said crystals whereby certain of said contact members are engaged and the remaining contact members are disengaged by the deformation of said crystals resulting from the impression of said electrical voltage means thereon.

13. A piezoelectric relay comprising two outer stacks of piezoelectric crystal laminations parallel to the length of said outer stacks and longitudinally contractible upon the application of a voltage thereto, an inner stack of piezoelectric crystal laminations perpendicular to the length of said inner stack and longitudinal expansible upon the application of a voltage thereto in spaced alignment between said outer stacks, a free end and a constrained end on each of said stacks, a yoke joining said free ends of said outer stacks, a rigid base member, means for affixing said constrained ends of each of said stacks to said base member, a first contact element integral with said yoke, a second contact element integral with said free end of said inner stack matable with said first contact element, a plurality of electrodes in electrical contact with said stacks, and means for applying a direct-current voltage to said electrodes whereby the application of said voltage to each of said stacks will cause said contact elements to engage.

14. A piezoelectric relay comprising two outer stacks of piezoelectric crystal laminations perpendicular to the length of said outer stacks and longitudinally expansible upon the application of a voltage thereto, an inner stack of piezoelectric crystal laminations parallel to the length of said inner stack and longitudinally contractible upon the application of a voltage thereto spaced in proximity to and between said outer stacks, a free end and a constrained end on each of said stacks, a yoke joining said free ends of outer stacks, a rigid base member, means for affixing said constrained ends of each of said stacks to base base member, a first contact element integral with said yoke, a second contact element integral with said free end of said inner stack matable with said first contact element, a plurality of electrodes in electrical contact with said stacks and means for applying a direct-current voltage to said electrodes whereby the application of said voltage to each of said stacks will cause said contact elements to disengage.

References Cited in the file of this patent

UNITED STATES PATENTS

| | | |
|---|---|---|
| 1,597,630 | Spenks | Aug. 25, 1926 |
| 1,834,786 | Kacser | Dec. 1, 1931 |
| 2,195,417 | Mason | Apr. 2, 1940 |
| 2,227,268 | Mason | Dec. 31, 1940 |
| 2,487,268 | Oleson | Nov. 8, 1949 |
| 2,497,108 | Williams | Feb. 14, 1950 |
| 2,503,273 | Johnson | Apr. 11, 1950 |
| 2,664,481 | Pearl et al. | Dec. 29, 1953 |
| 2,760,023 | Kettering et al. | Aug. 21, 1956 |

FOREIGN PATENTS

| | | |
|---|---|---|
| 495,657 | Germany | Apr. 10, 1930 |